INVENTOR.
DONALD R. TAYLOR, JR.
BY
Fordyce A. Bothwell
ATTORNEY

June 29, 1965 D. R. TAYLOR, JR 3,192,314
SYNCHRONIZING SIGNAL SEPARATOR MAKING USE OF
FORWARD AND REVERSE SPACE CHARGE CURRENTS
Filed April 25, 1962 3 Sheets-Sheet 2

INVENTOR.
DONALD R. TAYLOR, JR.
BY
Fordyce A. Bothwell
ATTORNEY

INVENTOR.
DONALD R. TAYLOR, JR.
BY
Fordyce A. Bothwell
ATTORNEY

United States Patent Office 3,192,314

Patented June 29, 1965

3,192,314

SYNCHRONIZING SIGNAL SEPARATOR MAKING USE OF FORWARD AND REVERSE SPACE CHARGE CURRENTS

Donald R. Taylor, Jr., Philadelphia, Pa., assignor to Philco Corporation, Philadelphia, Pa., a corporation of Delaware Filed Apr. 25, 1962, Ser. No. 190,114

18 Claims. (Cl. 178—5.8)

This invention relates to television receivers and more particularly to the performance therein of horizontal phase detection and other functions including vertical sync separation, automatic gain control (AGC), video amplification, and sound IF amplification.

As is well understood in the art, horizontal phase detection is commonly employed to maintain the horizontal oscillator in proper phase relation to the received horizontal sync pulses.

One object of the present invention is to provide an improved horizontal phase detector or comparator which utilizes the pulses, hereinafter termed "timing-indicative pulses," that are present in the conventional horizontal deflection system. In accordance with this invention, space current flow in an electron tube is controlled according to the phase relation between said pulses and the horizontal sync pulses in a manner to produce a control voltage whenever an out-of-phase relation exists. The arrangement is such that normal and reverse space currents are caused to flow in said tube which are balanced and effectively cancel one another when the desired in-phase relation exists but which become unbalanced and produce an APC (automatic phase control) voltage whenever an out-of-phase condition exists.

Another object of the invention is to effect simplification in a television receiver by causing one electron tube to perform a plurality of functions. In accordance with this invention, vertical sync separation and horizontal phase detection are achieved by employing a multi-grid tube in a circuit arrangement wherein vertical sync separation is effected at one grid of said tube and horizontal phase detection is effected by means of voltages applied to another grid and to the anode, at least one of said voltages being derived from the timing-indicative pulses.

Still another object of the invention is to provide an arrangement whereby a single tube is utilized for the performance of other functions in addition to those abovementioned, including AGC, video amplification and sound IF amplification.

The invention may be fully understood from the following detailed description with reference to the accompanying drawings wherein FIG. 1 is a schematic illustration of one embodiment of the invention;

Figure 1:
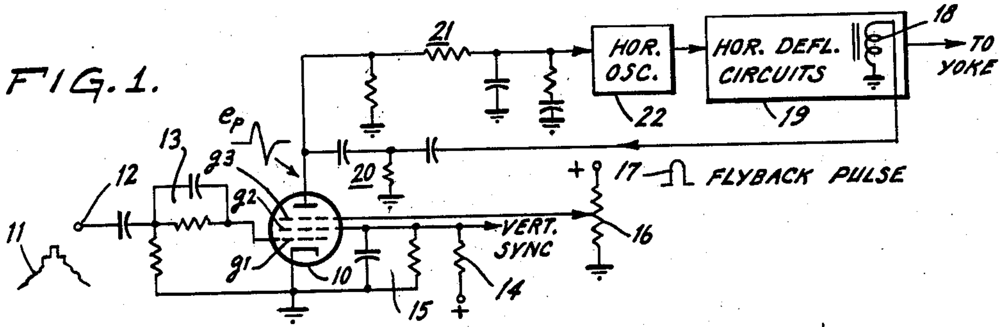

Referring first to FIG. 1, the embodiment there illustrated employs a single vacuum tube 10 having grids $g1$, $g2$ and $g3$. The composite video signal 11 with sync positive is applied to terminal 12 and thence through the usual sync separator coupling ararngement 13 to grid $g1$. Grids $g1$ and $g2$ together with the cathode function as a typical triode sync separator, and the vertical sync is derived from load resistor 14, the relatively high frequency horizontal sync being removed by filter 15.

To effect horizontal phase detection, a positive voltage is applied to grid $g3$ from potentiometer 16, and voltage pulses $e_p$ (only one shown) are applied to the anode. These pulses are produced by deriving the flyback pulses 17 (only one shown) as by means of a winding 18 on the flyback transformer of the horizontal deflection circuits 19, and by differentiating each flyback pulse in differentiating network 20. These pulses are indicative of the timing of the horizontal deflection cycles. The APC voltage is derived from the plate through filter 21 and is supplied to the horizontal oscillator 22 which is part of the horizontal deflection system.

Figure 2:
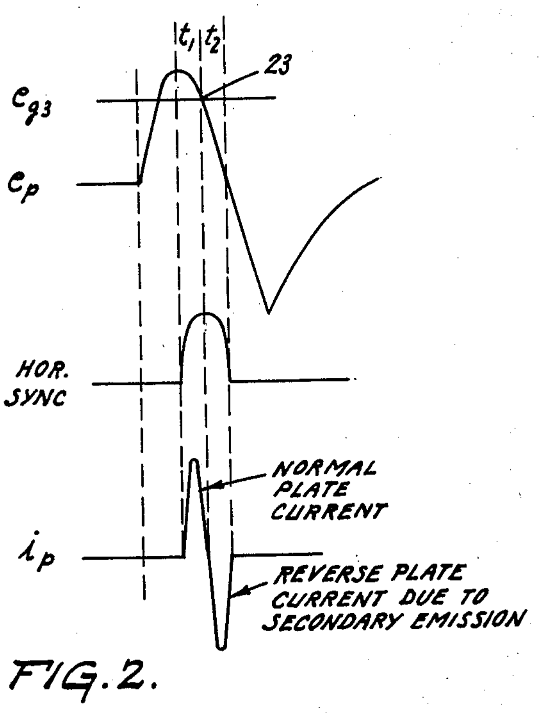
FIG. 2 is an explanatory illustration of the manner in which horizontal phase detection is performed in the system of FIG. 1.

The manner in which horizontal phase detection is performed can be readily understood from the illustration of FIG. 2. It will be apparent that plate current flow in tube 10 is controlled by the horizontal sync pulse and by the voltages applied to grid $g3$ and the anode. The voltage $e_{g3}$ is adjusted so that the point 23 of its intersection with $e_p$ coincides in time with the center of the horizontal sync pulse when the proper phase relation exists between the flyback pulse and the horizontal sync pulse. With this condition existing, during the time $t_1$ the plate voltage $e_p$ is greater than $e_{g3}$ and normal plate current $i_p$ flows. However during the time interval $t_2$ the voltage $e_{g3}$ is greater than $e_p$ and secondary emission takes place between the plate and grid $g3$ with the result that the plate current $i_p$ is reversed. Under this condition the average normal and reverse plate currents are substantially equal and cancel one another so that there is no APC voltage produced.

Now suppose that the horizontal oscillator drifts out of the proper phase relationship. This will cause a shift of $e_p$ with the result that the normal and reverse plate currents become unequal according to the direction and amount of phase change, and an APC voltage will be produced which changes the phase of the horizontal oscillator to restore the in-phase condition. Depending on whether the normal or reverse plate current predominates, the APC voltage will be of one polarity or the other and its amplitude will be proportional to the degree of unbalance of the normal and reverse currents.

It will be apparent that the voltages applied to grid $g3$ and the anode could be reversed. This would simply reverse the polarity of the APC voltage which would be applied accordingly to correct the phase of the horizontal oscillator.

While in the above-described embodiment and others to be described the flyback pulses are employed, it is possible to employ any timing-indicative pulses of proper amplitude and shape. For example pulses from the oscillator or driving circuits could be employed.

Figure 4:
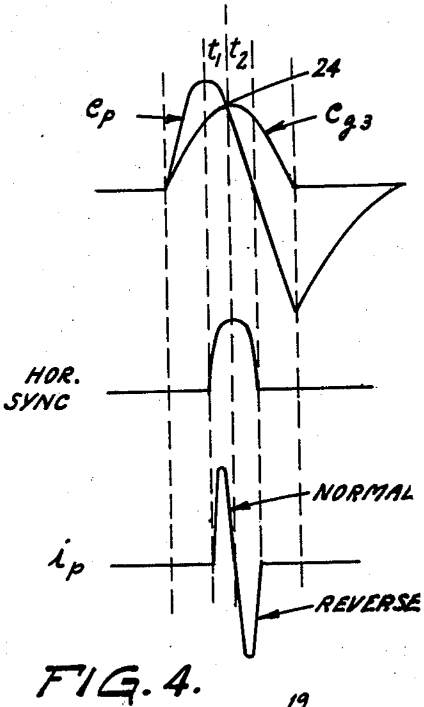
FIG. 4 is an explanatory illustration of the manner in which horizontal phase detection is performed in the embodiment of FIG. 3.
Figure 3:
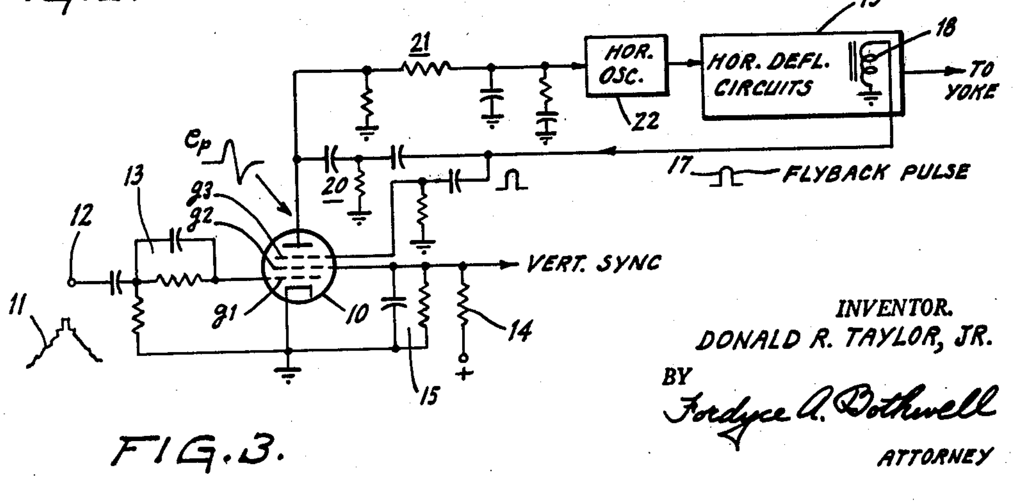
FIG. 3 is a schematic illustration of another embodiment of the invention.

Referring now to FIG. 3, there is shown a preferred phase detection arrangement which is identical with that of FIG. 1 except that instead of applying a constant voltage to grid $g3$ the flyback pulse 17 is applied thereto without differentiation. FIG. 4 depicts the horizontal phase detection. By adjusting the relative amplitudes of $e_p$ and $e_{g3}$ their crossover point 24 can be made to coincide in time with the center of the horizontal sync pulse when the proper phase relation exists between the flyback pulse and the horizontal sync pulse. During interval $t_1$ the plate voltage $e_p$ is greater than $e_{g3}$ and normal plate current flows. During interval $t_2$ the plate voltage is less than $e_{g3}$ and reverse plate current flows due to secondary emission between the plate and grid $g3$. The average currents cancel one another as long as the horizontal oscillator is operating in proper phase.

Suppose now that the horizontal oscillator drifts out of proper phase. This will cause the voltages $e_p$ and $e_{g3}$ to shift in one direction or the other depending upon the direction of oscillator drift. Consequently the normal and reverse plate currents will become unbalanced and an APC voltage will be produced, the polarity of which will depend on the direction of drift, and the amplitude of which will depend on the amount of drift. This voltage, applied to the horizontal oscillator, will restore the proper phase thereof.

Here again it will be apparent that the voltages $e_p$ and $e_{g3}$ could be reversed, since the only result thereof would be to reverse the polarity of the APC voltage which could be applied accordingly to correct the phase of the horizontal oscillator.

Figure 5:
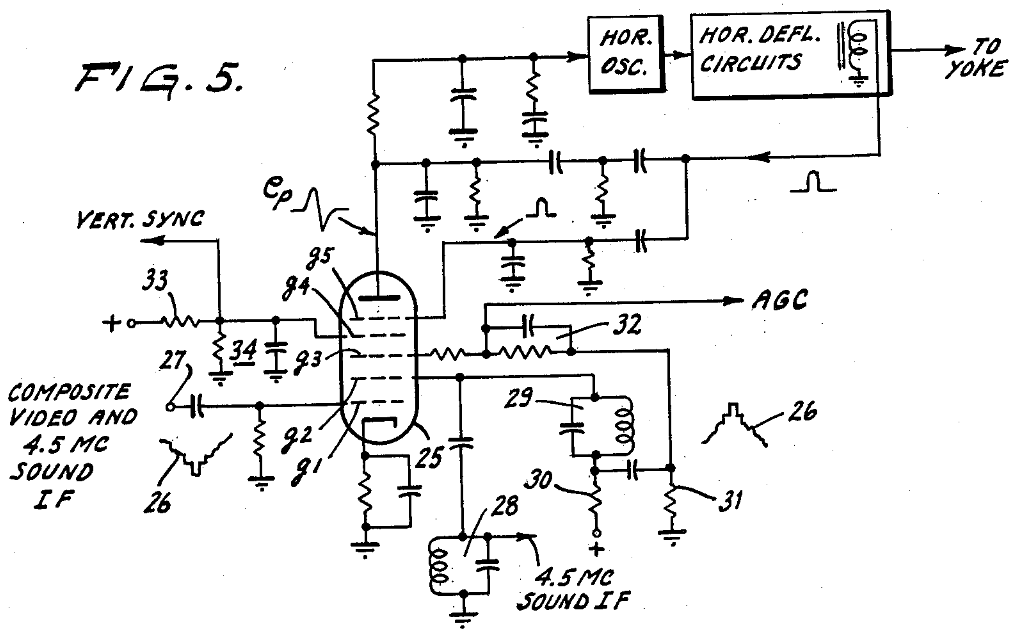
FIGS. 5 to 7 are schematic illustrations of still other embodiments of the invention.

Referring now to FIG. 5, the circuit arrangement there shown, emloying a single tube, performs the same functions as does the circuit arrangement of FIG. 3 and also performs additional functions. In this instance a pentagrid tube 25 is employed. The video signal 26 with sync negative and the 4.5 mc. intercarrier sound IF signal are supplied to grid *g1* via terminal 27. Grids *g1* and *g2* serve respectively as the grid and anode of a triode amplifier. The amplified 4.5 mc. sound IF signal is derived by way of tuned circuit 28. The amplified and polarity-inverted video signal 26 appears in the triode output circuit which includes tuned circuit 29 and resistor 30. This signal is derived across resistor 31 and is applied to grid *g3* through a usual sync separator coupling arrangement 32 from which AGC voltage may be derived. Grids *g3* and *g4* serve respectively as the grid and anode of a typical triode sync separator. Both horizontal and vertical sync pulses are available at grid *g4*. Vertical sync pulses are derived from across load resistor 33, the horizontal sync being filtered out by filter 34. The horizontal phase detection function is performed in the same manner as in the circuit arrangement of FIG. 3. In this instance however grids *g3*, *g4* and *g5* correspond to the three grids in FIG. 3 and serve the same functions.

It should be noted that this arrangement has the additional advantage of noise protection; that is to say the tube 25 serves additionally as a noise gate. If a large noise spike appears in the input signal applied to grid *g1* it cuts the tube off. This noise gating action protects all of the associated circuits and their functions against the adverse effect of noise.

Figure 6:
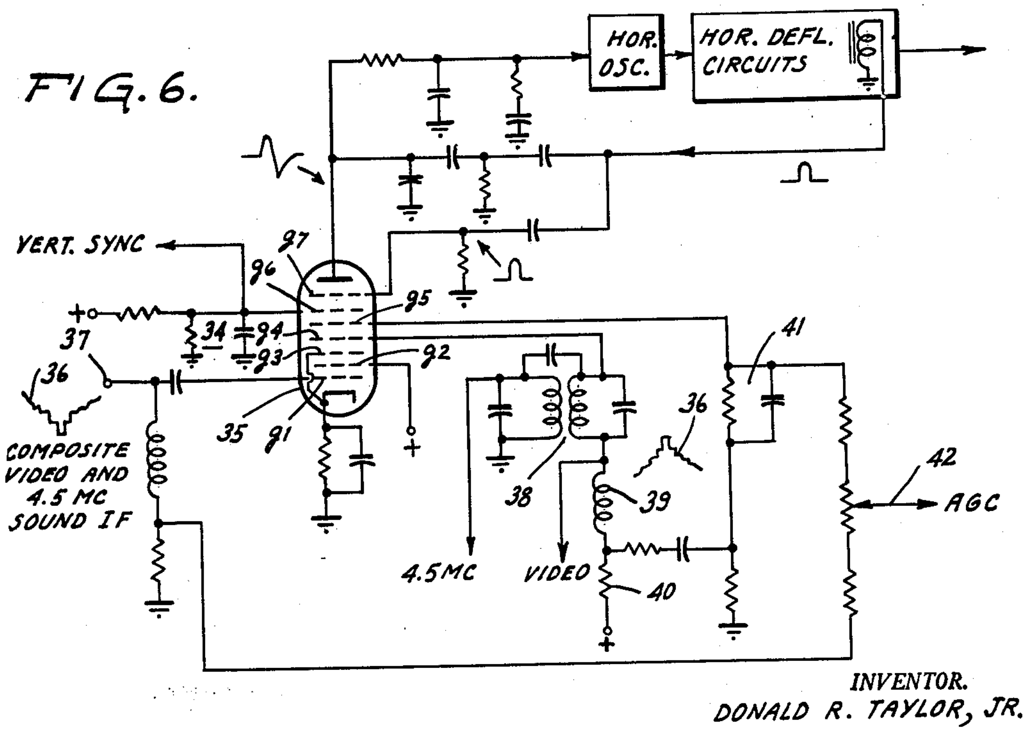

Referring now to FIG. 6, the circuit arrangement there shown is generally similar to that of FIG. 5 but it has the further advantage of pentode amplification of video and sound IF. In this instance the tube 35 has seven grids. The video signal 36 with sync negative and the intercarrier sound IF signal are applied to grid *g1* via terminal 37. Grids *g1* to *g4* together with the cathode serve as a pentode amplifier. The amplified 4.5 mc. sound IF signal is derived from tuned transformer 38. The amplified and polarity-inverted video signal is derived from across peaking coil 39 and resistor 40. Video signal is also derived from across resistor 40 and is applied to grid *g5* through a usual sync separator coupling arrangement 41. The self-bias at grid *g5* may be removed and combined with second detector voltage in the usual way for AGC purposes, the AGC voltage being derived at connection 42. Vertical sync separation occurs at grid *g6*. Horizontal phase detection occurs through the action of grid *g7* and the anode. The tube also acts as a noise gate as in the arrangement of FIG. 5.

Figure 7:
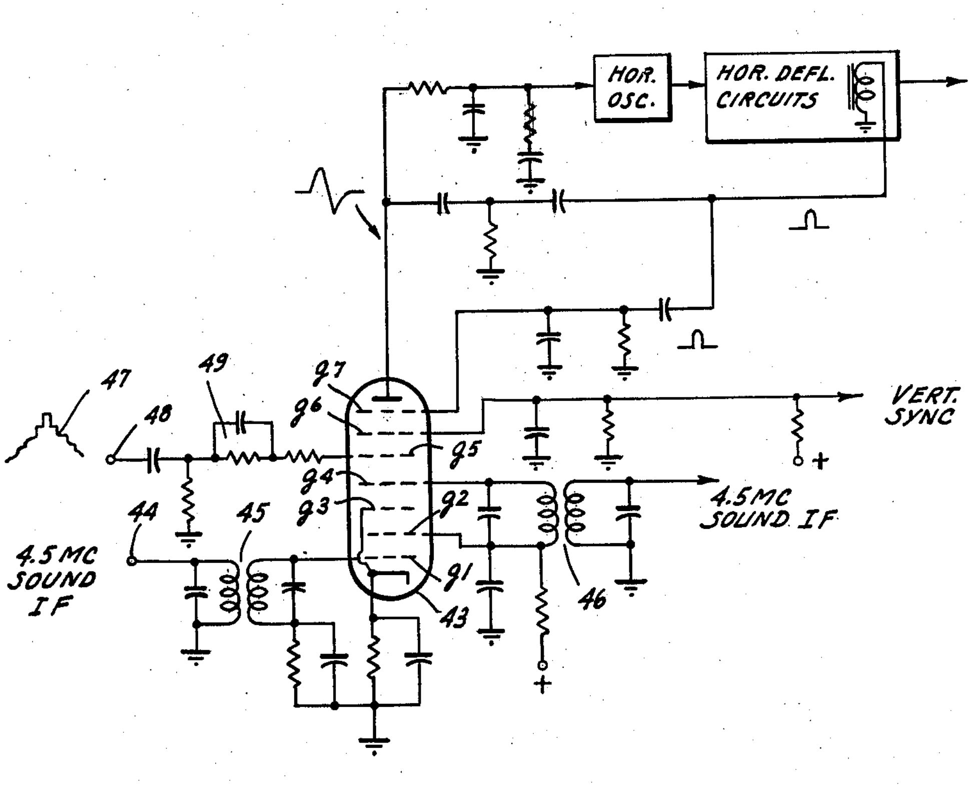

Referring now to FIG. 7, the circuit arrangement there shown also employs a tube 43 having seven grids. As in the arrangement of FIG. 6, the 4.5 mc. sound IF signal is amplified by the pentode constituted by the cathode and grids *g1* to *g4*. This signal is supplied to terminal 44 and thence to grid *g1* through tuned transformer 45. The amplified signal is derived from grid *g4*, acting as the pentode anode, through tuned transformer 46.

In this instance, however, the composite video signal 47 with sync positive is applied to terminal 48 and thence to grid *g5* through a usual sync separator coupling arrangement 49. Vertical sync separation occurs at grid *g6*. Horizontal phase detection occurs through the action of grid *g7* and the anode.

Thus in all of the illustrated embodiments a multigrid tube is made to serve as a horizontal phase detector and also as a vertical sync separator, and in the embodiments of FIGS. 5 to 7 the tube is made to serve additional functions.

In the phase detection arrangement as described differentiated and unmodified pulses are employed, but the invention contemplates the use of any pulses suitable for the purpose. Thus it is possible to use differentiated and integrated pulses or unmodified and integrated pulses. It is also possible to use two sets of differentiated pulses, or two sets of integrated pulses, or two set of unmodified pulses. It is only necessary that the two sets of pulses be so related as to effect the action as described.

Thus while certain embodiments have been illustrated and described, it will be understood that the invention is not limited thereto but contemplates such modifications and other embodiments as may occur to those skilled in the art.

I claim:

1. In a television receiver in which horizontal synchronizing pulses serve to control a horizontal deflection system in which pulses are produced that are indicative of the timing of the horizontal deflection cycles, a horizontal phase comparator comprising: an electron tube having a cathode, a grid, and at least two other electrodes in succession; means for supplying said horizontal synchronizing pulses to said grid; means for utilizing said timing-indicative pulses to supply to said two electrodes voltages which cause normal and reverse space currents to flow in said tube according to the timing of said deflection cycles in relation to said horizontal synchronizing pulses, the average normal and reverse currents being equal and cancelling one another when the horizontal deflection system is synchronized with said horizontal synchronizing pulses; and means for deriving a control voltage according to unbalance of the average normal and reverse currents due to non-synchronization of the horizontal deflection system with the horizontal synchronizing pulses.

2. In a television receiver in which horizontal synchronizing pulses serve to control a horizontal deflection system in which pulses are produced that are indicative of the timing of the horizontal deflection cycles, a horizontal phase comparator comprising: an electron tube having a cathode, a grid, and at least two other electrodes in succession; means for supplying said horizontal synchronizing pulses to said grid; means for supplying to one of said two electrodes timing pulses derived from said deflection system; means for applying to the other of said two electrodes a voltage which in cooperation with said timing pulses causes normal and reverse space currents to flow in said tube according to the phase relation between the timing pulses and the horizontal synchronizing pulses, the average normal and reverse currents being equal and cancelling one another when the horizontal deflection system is synchronized with said horizontal synchronizing pulses; and means for deriving a control voltage according to unbalance of the average normal and reverse currents due to non-synchronization of the horizontal deflection system with the horizontal synchronizing pulses.

3. In a television receiver in which horizontal synchronizing pulses serve to control a horizontal deflection system in which pulses are produced that are indicative of the timing of the horizontal deflection cycles, a horizontal phase comparator comprising: an electron tube having a cathode, a grid and at least two other electrodes in succession; means for supplying said horizontal synchronizing pulses to said grid; means for differentiating said timing-indicative pulses and supplying them to one of said two electrodes; means for applying to the other of said two electrodes a voltage which in cooperation with said differentiated pulses causes normal and reverse space currents to flow in said tube according to the phase relation between said timing-indicative pulses and the horizontal synchronizing pulses; and means for deriving a control voltage according to unbalance of the normal and reverse space currents.

4. In a television receiver in which horizontal synchronizing pulses serve to control a horizontal deflection system in which pulses are produced that are indicative of the timing of the horizontal deflection cycles, a horizontal phase comparator comprising: an electron tube having a cathode, a grid and at least two other electrodes in succession; means for supplying said horizontal synchronizing pulses to said grid; means for differentiating said timing-indicative pulses and supplying them to one of said two electrodes; means for supplying said timing-indicative pulses without differentiation to the other of said two electrodes, whereby normal and reverse space currents are caused to flow in said tube according to the phase relation between said timing-indicative pulses and the horizontal synchronizing pulses; and means for deriving a control voltage according to unbalance of the normal and reverse space currents.

5. In a television receiver; a horizontal deflection system including a horizontal oscillator; an electron tube having a cathode, a grid and at least two other electrodes in succession; means for supplying horizontal synchronizing pulses to said grid; means for deriving from said deflection system pulses that are indicative of the timing of the horizontal deflection cycles; means for utilizing said timing-indicative pulses to supply to said two electrodes voltages which cause normal and reverse space currents to flow in said tube according to the timing of said deflection cycles in relation to said horizontal synchronizing pulses; means for deriving a control voltage according to unbalance of the normal and reverse space currents; and means for applying said control voltage to said oscillator to control the phase thereof.

6. In a television receiver; a horizontal deflection system including a horizontal oscillator; an electron tube having a cathode, a grid and at least two other electrodes in succession; means for supplying horizontal synchronizing pulses to said grid; means for deriving from said deflection system pulses that are indicative of the timing of the horizontal deflection cycles; means for differentiating said timing-indicative pulses and supplying them to one of said two electrodes; means for applying to the other of said two electrodes a voltage which in cooperation with said differentiated pulses causes normal and reverse space currents to flow in said tube according to the phase relation between said timing-indicative pulses and the horizontal synchronizing pulses; means for deriving a control voltage according to unbalance of the normal and reverse space currents; and means for applying said control voltage to said oscillator to control the phase thereof.

7. In a television receiver, a horizontal deflection system including a horizontal oscillator; an electron tube having a cathode, a grid and at least two other electrodes in succession; means for supplying horizontal synchronizing pulses to said grid; means for deriving from said deflection system pulses that are indicative of the timing of the horizontal deflection cycles; means for differentiating said timing-indicative pulses and supplying them to one of said two electrodes; means for supplying said timing-indicative pulses without differentiation to the other of said two electrodes, whereby normal and reverse space currents are caused to flow in said tube according to the phase relation between said timing-indicative pulses and the horizontal synchronizing pulses; means for deriving a control voltage according to unbalance of the normal and reverse space currents; and means for applying said control voltage to said oscillator to control the phase thereof.

8. In a television receiver for receiving a composite signal including vertical and horizontal synchronizing pulses, wherein there are produced in the horizontal deflection system pulses that are indicative of the timing of the horizontal deflection cycles, a combined vertical sync separator and horizontal phase comparator comprising: an electron tube having a cathode, a grid and at least three other electrodes in succession; means for supplying said composite signal to said grid; means for deriving the vertical synchronizing pulses of said signal at one of said three electrodes; means for differentiating said timing-indicative pulses and supplying them to another of said three electrodes; means for applying to still another of said three electrodes a voltage which in cooperation with said differentiated pulses causes normal and reverse space currents to flow in said tube according to the phase relation between said timing-indicative pulses and the horizontal synchronizing pulses; and means for deriving a control voltage according to unbalance of the normal and reverse space currents.

9. In a television receiver for receiving a composite signal including vertical and horizontal synchronizing pulses, wherein there are produced in the horizontal deflection system pulses that are indicative of the timing of the horizontal deflection cycles, a combined vertical sync separator and horizontal phase comparator comprising: an electron tube having a cathode, a grid and at least three other electrodes in succession; means for supply-said composite signal to said grid; means for deriving the vertical synchronizing pulses of said signal at one of said three electrodes; means for differentiating said timing-indicative pulses and supplying them to another of said three electrodes; means for supplying said timing-indicative pulses without differentiation to still another of said three electrodes, whereby normal and reverse space currents are caused to flow in said tube according to the phase relation between said timing-indicative pulses and the horizontal synchronizing pulses; and means for deriving a control voltage according to unbalance of the normal and reverse space currents.

10. In a television receiver for receiving a composite signal including vertical and horizontal synchronizing pulses, wherein there are produced in the horizontal deflection system pulses that are indicative of the timing of the horizontal deflection cycles, multi-function apparatus comprising: an electron tube having a cathode, a control grid and at least five other electrodes in succession; means for supplying said composite signal with sync negative to said control grid; means for deriving said composite signal, amplified and with its polarity inverted, from the first of said other electrodes; means for supplying the polarity-inverted signal to the second of said other electrodes; means for deriving the vertical synchronizing pulses of said signal at the third of said other electrodes; means for utilizing said timing-indicative pulses to supply to the remaining two electrodes voltages which cause normal and reverse space currents to flow in said tube according to the phase relation between said timing-indicative pulses and the horizontal synchronizing pulses; and means for deriving a control voltage according to unbalance of the normal and reverse space currents.

11. In a television receiver for receiving a composite signal including vertical and horizontal synchronizing pulses, wherein there are produced in the horizontal deflection system pulses that are indicative of the timing of the horizontal deflection cycles, multi-function apparatus comprising: an electron tube having a cathode, a control grid and at least five other electrodes in succession; means for supplying said composite signal with sync negative to said control grid; means for deriving said composite signal, amplified and with its polarity inverted, from the first of said other electrodes; means for supplying the polarity-inverted signal to the second of said other electrodes; means for deriving an automatic gain control voltage from said last means, means for deriving the vertical synchronizing pulses of said signal at the third of said other electrodes; means for supplying timing-indicative pulses to one of the remaining two electrodes; means for supplying differentiated timing-indicative pulses to the other remaining electrode, whereby normal and reverse space currents are caused to flow in said tube according to the phase relation between the timing-indicative pulses and the horizontal synchronizing pulses; and means for deriving a control voltage according to unbalance of the normal and reverse space currents.

12. In a television receiver for receiving a composite signal including vertical and horizontal synchronizing pulses, wherein there are produced in the horizontal deflection system pulses that are indicative of the timing of the horizontal deflection cycles, multi-function apparatus comprising: an electron tube having a cathode, seven grids and an anode in succession, the cathode and the first four grids constituting a pentode amplifier; means for supplying said composite signal with sync negative to the first grid; means for deriving said composite signal, amplified and with its polarity inverted, from the fourth grid; means for supplying the polarity-inverted signal to the fifth grid; means for deriving the vertical synchronizing pulses of said signal at the sixth grid; means for supplying timing-indicative pulses to one of the two remaining electrodes including the seventh grid and the anode; means for supplying differentiated timing-indicative pulses to the other of said two remaining electrodes, whereby normal and reverse space currents are caused to flow in said tube according to the phase relation between the timing-indicative pulses and the horizontal synchronizing pulses; and means for deriving a control voltage according to unbalance of the normal and reverse space currents.

13. In a television receiver for receiving a composite signal including vertical and horizontal synchronizing pulses, wherein there are produced in the horizontal deflection system pulses that are indicative of the timing of the horizontal deflection cycles, multi-function apparatus comprising: an electron tube having a cathode, seven grids and an anode in succession, the cathode and the first four grids constituting a pentode amplifier; means for supplying said composite signal with sync negative to the first grid; means for deriving said composite signal, amplified and with its polarity inverted, from the fourth grid; means for supplying the polarity-inverted signal to the fifth grid; means for deriving an automatic gain control voltage from said last means; means for deriving the vertical synchronizing pulses of said signal at the sixth grid; means for supplying timing-indicative pulses to one of the two remaining electrodes including the seventh grid and the anode; means for supplying differentiated timing-indicative pulses to the other of said two remaining electrodes, whereby normal and reverse space currents are caused to flow in said tube according to the phase relation between the timing-indicative pulses and the horizontal synchronizing pulses; and means for deriving a control voltage according to unbalance of the normal and reverse space currents.

14. In a television receiver wherein there are present a sound IF signal and a composite video signal including vertical and horizontal synchronizing pulses, and wherein there are produced in the horizontal deflection system pulses that are indicative of the timing of the horizontal deflection cycles, multi-function apparatus comprising: an electron tube having a cathode, a control grid and at least five other electrodes in succession; means for supplying said composite signal with sync negative and said sound IF signal to said control grid; means for deriving said sound IF signal amplified from the first of said other electrodes; means for deriving said composite signal, amplified and with its polarity inverted, from the same electrode; means for supplying the polarity-inverted signal to the second of said other electrodes; means for deriving the vertical synchronizing pulses of the latter signal at the third of said other electrodes; means for applying timing indicative pulses to one of the remaining two electrodes; means for supply differentiating timing-indicative pulses to the other remaining electrode, whereby normal and reverse space currents are caused to flow in said tube according to the phase relation between the timing-indicative pulses and the horizontal synchronizing pulses; and means for deriving a control voltage according to unbalance of the normal and reverse space currents.

15. In a television receiver wherein there are present a sound IF signal and a composite video signal including vertical and horizontal synchronizing pulses, and wherein there are produced in the horizontal deflection system pulses that are indicative of the timing of the horizontal deflection cycles, multi-function apparatus comprising: an electron tube having a cathode, seven grids and an anode in succession, the cathode and the first four grids constituting a pentode amplifier; means for supplying said composite signal with sync negative and said sound IF signal to the first grid; means for deriving said sound IF signal amplified from the fourth grid; means for deriving said composite signal, amplified and with its polarity inverted, from the same grid; means for supplying the polarity-inverted signal to the fifth grid; means for deriving the vertical synchronizing pulses of the latter signal at the sixth grid; means for applying timing-indicative pulses to one of the remaining two electrodes including the seventh grid and the anode; means for supply differentiated timing-indicative pulses to the other of said two remaining electrodes; whereby normal and reverse space currents are caused to flow in said tube according to the phase relation between the timing indicative pulses and the horizontal synchronizing pulses; and means for deriving a control voltage according to unbalance of the normal and reverse space currents.

16. In a television receiver wherein there are present a sound IF signal and a composite video signal including vertical and horizontal synchronizing pulses, and wherein there are produced in the horizontal deflection system pulses that are indicative of the timing of the horizontal deflection cycles, multi-function apparatus comprising: an electron tube having a cathode, seven grids and an anode in succession, the cathode and the first four grids constituting a pentode amplifier; means for supplying said sound IF signal to the first grid; means for deriving said sound IF signal amplified from the fourth grid; means for supplying said composite signal with sync positive to the fifth grid; means for deriving the vertical synchronizing pulses of the latter signal at the sixth grid; means for applying timing-indicative pulses to one of the two remaining electrodes including the seventh grid and the anode; means for applying differentiated timing-indicative pulses to the other of said two remaining electrodes, whereby normal and reverse space currents are caused to flow in said tube according to the phase relation between the timing-indicative pulses and the horizontal synchronizing pulses; and means for deriving a control voltage according to unbalance of the normal and reverse space currents.

17. In a television receiver in which horizontal synchronizing pulses serve to control a horizontal deflection system in which pulses are produced that are indicative of the timing of the horizontal deflection cycles, a horizontal phase comparator comprising: an electron tube having a cathode, at least two grids, and an anode in succession; means for supplying said horizontal synchronizing pulses to the first of said grids; means for utilizing said timing-indicative pulses to supply to the other of said grids and to said anode voltages having different instantaneous amplitudes such that normal and reverse space currents are caused to flow in said tube, during the occurrence of each horizontal synchronizing pulse, according to the timing of said deflection cycles in relation to said horizontal synchronizing pulses, the average normal and reverse currents being equal and cancelling one another when the horizontal deflection system is synchronized with said horizontal synchronizing pulses; and means for deriving a control voltage according to unbalance of the average normal and reverse currents due to non-synchronization of the horizontal deflection system with the horizontal synchronizing pulses.

18. In a television receiver for receiving a composite signal including vertical and horizontal synchronizing pulses, wherein there are produced in the horizontal deflection system pulses that are indicative of the timing of the horizontal deflection cycles, a combined vertical sync separator and horizontal phase comparator comprising: an electron tube having a cathode, a grid and at least three other electrodes in succession; means for supplying said composite signal to said grid; means for deriving the vertical synchronizing pulses of said signal at one of said three electrodes; means for utilizing said timing-indicative pulses to supply to the remaining two electrodes voltages which cause normal and reverse space currents to flow in said tube according to the phase relation between said timing-indicative pulses and the horizontal synchronizing pulses; and means for deriving a control voltage according to unbalance of the normal and reverse space currents.

References Cited by the Examiner

UNITED STATES PATENTS 2,898,458 8/59 Richman ---------- 178—7.5 XR

DAVID G. REDINBAUGH, *Primary Examiner*.